(12) United States Patent
Chen et al.

(10) Patent No.: US 11,366,768 B2
(45) Date of Patent: *Jun. 21, 2022

(54) DATA WRITE METHOD, APPARATUS, AND SYSTEM

(71) Applicant: Huawei Technologies Co., Ltd., Shenzhen (CN)

(72) Inventors: Lei Chen, Beijing (CN); Keji Huang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 120 days.

This patent is subject to a terminal disclaimer.

(21) Appl. No.: 17/003,370

(22) Filed: Aug. 26, 2020

(65) Prior Publication Data

US 2020/0394142 A1 Dec. 17, 2020

Related U.S. Application Data

(63) Continuation of application No. 15/977,379, filed on May 11, 2018, now Pat. No. 10,776,285, which is a (Continued)

(51) Int. Cl.
*G06F 12/14* (2006.01)
*G06F 3/06* (2006.01)
*G06F 9/52* (2006.01)

(52) U.S. Cl.
CPC .......... *G06F 12/1466* (2013.01); *G06F 3/065* (2013.01); *G06F 3/067* (2013.01);
(Continued)

(58) Field of Classification Search
CPC .. G06F 12/1466; G06F 3/0611; G06F 3/0614; G06F 3/0622; G06F 3/0637;
(Continued)

(56) References Cited

U.S. PATENT DOCUMENTS 6,457,098 B1  9/2002  DeKoning et al.
6,499,058 B1  12/2002  Hozumi
(Continued)

FOREIGN PATENT DOCUMENTS

CN    101252603 A    8/2008
CN    103392167 A    11/2013
(Continued)

OTHER PUBLICATIONS

Amiri, K. et al., "Highly concurrent shared storage," Proceedings of the International Conference On Distributed Computing Systems, Taipei, Apr. 2000, 11 pages.
(Continued)

*Primary Examiner* — Tuan V Thai
(74) *Attorney, Agent, or Firm* — Slater Matsil, LLP

(57) ABSTRACT

In an active-active system, if write lock permission is granted to a second storage array, a first storage array sends to-be-written data and a lock revocation request together to a lock server; the lock server sends a lock revocation request carrying the to-be-written data to the second storage array; after storing the to-be-written data, the second storage array sends a lock revocation success message to the lock server; the lock server gives the write lock permission to the first storage array; and the first storage array obtains the write lock permission and stores the to-be-written data.

13 Claims, 7 Drawing Sheets

Related U.S. Application Data continuation of application No. PCT/CN2015/100249, filed on Dec. 31, 2015.

(52) U.S. Cl.
CPC .......... *G06F 3/0611* (2013.01); *G06F 3/0614* (2013.01); *G06F 3/0622* (2013.01); *G06F 3/0637* (2013.01); *G06F 3/0659* (2013.01); *G06F 9/526* (2013.01)

(58) Field of Classification Search
CPC ...... G06F 3/0655; G06F 3/0659; G06F 3/067; G06F 9/526
See application file for complete search history.

(56) References Cited

U.S. PATENT DOCUMENTS

| | | | |
|---|---|---|---|
| 7,797,275 B2 | 9/2010 | Lee et al. | |
| 9,176,902 B1* | 11/2015 | Long | G06F 3/0635 |
| 9,959,062 B1* | 5/2018 | Piszczek | G06F 3/0619 |
| 10,318,171 B1* | 6/2019 | Kornfeld | G06F 3/0685 |
| 2004/0123068 A1 | 6/2004 | Hashimoto | |
| 2005/0155011 A1 | 7/2005 | Heik et al. | |
| 2006/0072587 A1 | 4/2006 | Ramaswamy et al. | |
| 2006/0139697 A1* | 6/2006 | Fuente | G06F 3/0689 |
| | | | 714/E11.136 |
| 2007/0174572 A1 | 7/2007 | Kano | |
| 2013/0271261 A1 | 10/2013 | Ribas et al. | |
| 2014/0025820 A1 | 1/2014 | Rawat et al. | |
| 2015/0012704 A1 | 1/2015 | Watanabe et al. | |
| 2015/0026417 A1 | 1/2015 | Guo | |
| 2015/0370827 A1 | 12/2015 | Parkison et al. | |
| 2019/0182669 A1 | 6/2019 | Conrad et al. | |

FOREIGN PATENT DOCUMENTS

| | | |
|---|---|---|
| CN | 103827843 A | 5/2014 |
| CN | 104536834 A | 4/2015 |
| CN | 104636088 A | 5/2015 |
| CN | 104954392 A | 9/2015 |
| JP | 2001125868 A | 5/2001 |
| JP | 2005285086 A | 10/2005 |

OTHER PUBLICATIONS

Chevalier, P.-Y., "A Replicated Object Server for a Distributed Object-Oriented System," IEEE Proceedings 11th Symposium on Reliable Distributed Systems, Oct. 5-7, 1992, pp. 4-11.

Huawei Technologies Co. Ltd., "Active-Active DC Solution Technical White Paper (HyperMetro)," Business Continuity and Disaster Recovery Solution, Issue 01, Jun. 29, 2015, 88 pages.

Tasci, S. et al., "PANOPTICON: An Omniscient Lock Broker for Efficient Distributed Transactions in the Datacenter," IEEE International Conference on Big Data (Big Data), Oct. 29-Nov. 1, 2015, pp. 253-262.

* cited by examiner

DATA WRITE METHOD, APPARATUS, AND SYSTEM

CROSS-REFERENCE TO RELATED APPLICATIONS

This application is a continuation of U.S. patent Ser. No. 15/977,379, filed on May 11, 2018, which is a continuation of International Application No. PCT/CN2015/100249, filed on Dec. 31, 2015. Both of the aforementioned applications are hereby incorporated by reference in their entireties.

TECHNICAL FIELD

The present invention relates to the computer field, and in particular, to a storage technology.

BACKGROUND

In a storage area network (SAN) technology, a host is connected to a storage array using a fiber channel (FC), and a storage system provides data storage services to the host.

To improve data stability, a storage system may use two storage arrays. Referring to FIG. 1, there is a storage array 121 and a storage array 123 in a storage system, and the two storage arrays are connected to each other using an FC. When a host writes data to the storage array 121, the storage array 121 not only stores the data into a local storage, but also sends the data to the storage array 123 for storing. Similarly, data received by the storage array 123 is also sent to the storage array 121 for storing. In this storage manner, the two storage arrays can provide storage services to the host, and same data is stored in the two storage arrays. This is referred to as an active-active storage system. In an active-active storage system, even if one storage array is faulty, a host can also obtain data from the other storage array, therefore improving data security.

Same content is written into the two storage arrays. Therefore, logical address segments of the two storage arrays correspond to each other. To avoid inconsistent data in the two storage arrays, in specific implementation, a global lock is used to ensure mutually exclusive write operations. In a same time period, only one storage array can obtain a write lock of a logical address segment by applying, and only this storage array that has obtained the write lock of the logical address segment can write data to the two storage arrays.

If the storage array 121 has obtained, by applying, a write lock of a logical address segment from a lock server 122, the storage array 123 cannot obtain the write lock, and therefore, cannot write data to a logical address segment corresponding to the storage array 123. The storage array 123 can obtain the write lock only after the write lock is withdrawn by the lock server 122 from the storage array 121.

In a process of withdrawing the write lock, the two storage arrays need to communicate with the lock server 122. After the write lock is withdrawn, the two storage arrays also need to communicate with each other, so that data obtained by the storage array 121 is written to the storage array 123.

The storage array 121 and the storage array 123 are usually far apart, for example, at a distance of 100 km to 300 km. Therefore, in a topology in FIG. 1, the storage array 121 is adjacent to the lock server 122, and a time of communication between the two may be ignored. However, communication between the lock server 122 and the storage array 123 and communication between the storage array 121 and the storage array 123 may take a lot of time. For example, the communication takes several milliseconds each time. If the lock server 122 is moved closer to the storage array 123, although communication between the lock server 122 and the storage array 123 may take a shorter time, communication between the storage array 121 and the lock server 122 may correspondingly take a longer time.

Therefore, in a long-distance active-active system, how to reduce a total time of communication among a lock server and two storage arrays is a problem that needs to be resolved.

SUMMARY

A first aspect of embodiments of the present invention provides a data write method, and the method is applied to a lock server. The lock server is connected to a first storage array and a second storage array. The first storage array and the second storage array may form an active-active storage system. The method includes: receiving a locking request from a first storage array, where the locking request carries a locking command, to-be-written data, and a write address, and the write address describes a location for storing the to-be-written data. The method also includes sending, by the lock server, a lock revocation request to a second storage array if it is detected that write lock permission for the write address has already been granted to the second storage array, where the lock revocation request is used to withdraw the write lock permission, and the lock revocation request further carries the to-be-written data and the write address and is used to instruct the second storage array to store the to-be-written data according to the write address. The method also includes sending a lock allocation message to the first storage array after receiving a lock revocation success message sent by the second storage array, where the lock revocation success message is used to describe that the second storage array has finished the use of the write lock permission, and is further used to describe that the second storage array has written the to-be-written data, where the lock allocation message is used to allocate the write lock permission requested by the first storage array to the first storage array, and is further used to describe that the second storage array has completed the writing of the to-be-written data. It may be in an active-active storage system.

The method improves efficiency of writing data to the second storage array by the first storage array in a case of a lock conflict.

In a first possible implementation manner of the first aspect, after receiving the lock revocation request, the second storage array stores the to-be-written data into a local storage according to the write address, and sends the lock revocation success message; and after receiving the lock allocation message, the first storage array stores the to-be-written data into a local storage according to the write address.

The method may improve efficiency of writing same data at same locations of the first storage array and the second storage array in a case of a lock conflict.

With reference to the first possible implementation manner of the first aspect, optionally, the storing, by the second storage array, the to-be-written data into a local storage according to the write address includes: combining, by the second storage array, other to-be-written data and the to-be-written data, and storing combined data into the local storage according to the write address.

The method may further improve efficiency of writing data to the second storage array.

Optionally, the combining operation includes: if the other to-be-written data and the to-be-written data share an address-overlapping part, storing the address-overlapping part as the to-be-written data.

The method may provide a feasible measure for further improving the efficiency of data write to the second storage array.

In a second possible implementation manner of the first aspect, the first storage array and the second storage array each include a storage area network (SAN) storage controller and a storage connected to the SAN storage controller.

In a third possible implementation manner of the first aspect, the first storage array and the second storage array are object storage arrays, where the object storage array includes an object storage controller and an object storage.

In a fourth possible implementation manner of the first aspect, the write address is a logical unit number (LUN) ID and an address range in a LUN.

According to a second aspect, based on the first aspect and the various possible manners of the first aspect, the embodiments of the present invention further provide a corresponding lock management apparatus having a corresponding effect.

According to a third aspect, a system is provided in detail, and includes a lock server, a first storage array, and a second storage array.

The first storage array is configured to: receive a data write request, where the data write request carries to-be-written data and a write address, and the write address describes a location for storing the to-be-written data, and then send a locking request to the lock server, where the locking request carries a locking command, the to-be-written data, and the write address. The lock server is configured to: receive the locking request, and if it is detected that write lock permission for the write address has already been granted to the second storage array, send a lock revocation request to the second storage array, where the lock revocation request is used to withdraw the write lock permission granted to the second storage array, and the lock revocation request further carries the to-be-written data and the write address. The second storage array is configured to: after receiving the lock revocation request, store the to-be-written data into a local storage according to the write address, and then send a lock revocation success message to the lock server, where the lock revocation success message is used to describe that the second storage array has finished the use of the write lock permission, and further, the lock revocation success message carries information that the to-be-written data is successfully written. The lock server is further configured to send a lock allocation message to the first storage array after receiving the lock revocation success message, where the lock allocation message is used to allocate the write lock permission requested by the first storage array to the first storage array, and is further used to describe that the second storage array has completed writing of the to-be-written data. The first storage array is further configured to store the to-be-written data into a local storage according to the write address after receiving the lock allocation message.

An active-active system solution is provided to improve efficiency of an active-active system. In other words, efficiency of writing same data at same locations of the first storage array and the second storage array may be improved in a case of a lock conflict.

Correspondingly, embodiments of the present invention further provide two data write methods, applied to a storage controller of a first storage array and a storage controller of a second storage array respectively. The two storage controllers may respectively execute operations of the first storage array and the second storage array in the first aspect and various possible implementation manners of the first aspect, and have corresponding effects. A difference lies in that the storage array has a controller, while for the storage controller, a storage may not be located locally in the storage controller. In addition, for the two additionally provided data write methods, the embodiments of the present invention further provides apparatuses corresponding to the two methods.

Further, in embodiments of the present invention, the data write method executed by the first storage controller and the data write method executed by the second storage controller may be combined together. There are two combination manners. In one combination manner, the two methods are respectively executed by two storage controllers of a data write system, so as to write same to-be-written data to two storages. In another implementation manner, two methods are executed by a same storage controller. The storage controller plays a role of the controller in the first storage array in a process of writing the to-be-written data, and plays a role of the controller in the second storage array in another process of writing the to-be-written data.

Correspondingly, embodiments of the present invention further provide a non-volatile computer readable storage medium and a computer program product. When a memory of the storage device provided in the present invention loads a computer instruction included in the non-volatile computer readable storage medium and in the computer program product, a central processing unit (CPU) of the storage device executes the computer instruction, so that the storage device executes the various possible implementation solutions of the various aspects of the present invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
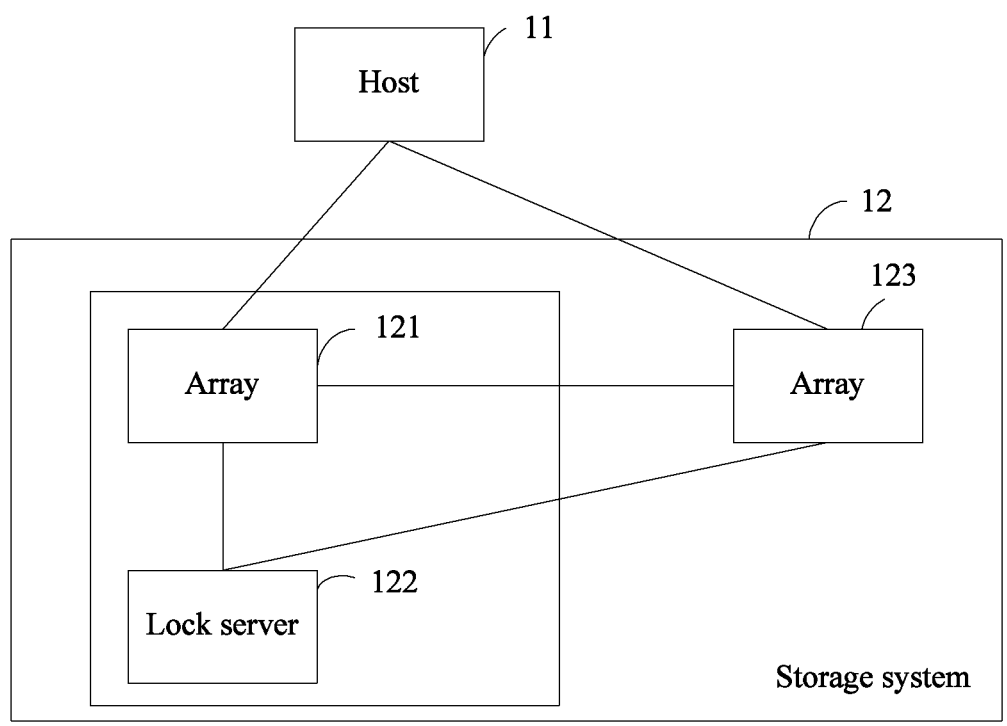
FIG. 1 is a topology diagram of an embodiment of a lock management system according to the present invention.

The following describes the technical solutions in the embodiments of the present invention with reference to the accompanying drawings in the embodiments of the present invention. Apparently, the described embodiments are merely some but not all of the embodiments of the present invention.

A storage system including a lock server, a first storage array, and a second storage array is used as an example. In a current system, after receiving to-be-written data from a host, the first storage array applies to the lock server for lock permission (which in an example may be write lock permission) according to a to-be-written address. If the write lock permission has been granted to the second storage array at this time (that is, a lock conflict exists), the lock server sends a lock revocation request to the second storage array, so that the second storage array releases the granted write lock permission in a timely manner after writing the data.

A process of data write is described in the following embodiment. It should be noted that data modification also belongs to data write.

After writing current data, the second storage array notifies the lock server that the write lock permission is released, that is, lock revocation succeeds. The lock server authorizes a write lock to the first storage array by sending an authorization message. After obtaining the write lock, the first storage array locally writes the to-be-written data, and sends the to-be-written data to the second storage array using a transmission channel between a first storage controller and a storage controller of the second storage array, so that the second storage array writes the to-be-written data. After both the first storage array and the second storage array write the to-be-written data, the whole process of data write ends.

Obviously, if the first storage array and the lock server are integrated, long-distance message transmission needs to be performed three times as follows. The lock server sends the lock revocation request to the second storage array. The second storage array releases the lock permission to the lock server. The first storage array sends the to-be-written data to the second storage array.

In short, in this embodiment of the present invention, the third message may be combined into the other two messages, so as to reduce a quantity of times of data transmission, and a total time of the entire service. In addition, according to this embodiment of the present invention, the second storage controller may combine the to-be-written data received from the first storage array and data in a local storage, and store combined data into a non-volatile storage medium, so that time is saved in comparison with separately storing the two pieces of data into the non-volatile storage medium.

Further, in a lock revocation response process and a process of allocating the lock to the first storage array by the lock server, a data write response message may also be combined, producing a time-saving effect. A lock revocation success message not only describes that the second storage array has finish the use of the write lock permission and that the write lock permission is withdrawn by the lock server, but also may carry information that the second storage array has finish the use of the write lock permission. A lock allocation message sent by the lock server to the first storage array is not only used to allocate the write lock permission requested by the first storage array to the first storage array, but also used to notify the first storage array that the second storage array have finish write of the to-be-written data.

It can be understood that for the message combination, a combined message only needs to carry information of a message before being combined. Naming of the message and a transmission manner of the corresponding information (for example, packet header transmission or payload transmission may be used) are not limited in the present application. For example, as described above, the lock revocation success message carries two pieces of information. A first piece of information may be information that revocation of the lock permission is allowed. A second piece of information may be information that the second storage array has finished the use of the write lock permission. Although the message is named "lock revocation success message", it does not mean a priority relationship between the first piece of information and the second piece of information, or limit locations of the two pieces of information in the whole message, or limit types of fields for recording the two pieces of information in the message.

Figure 2:
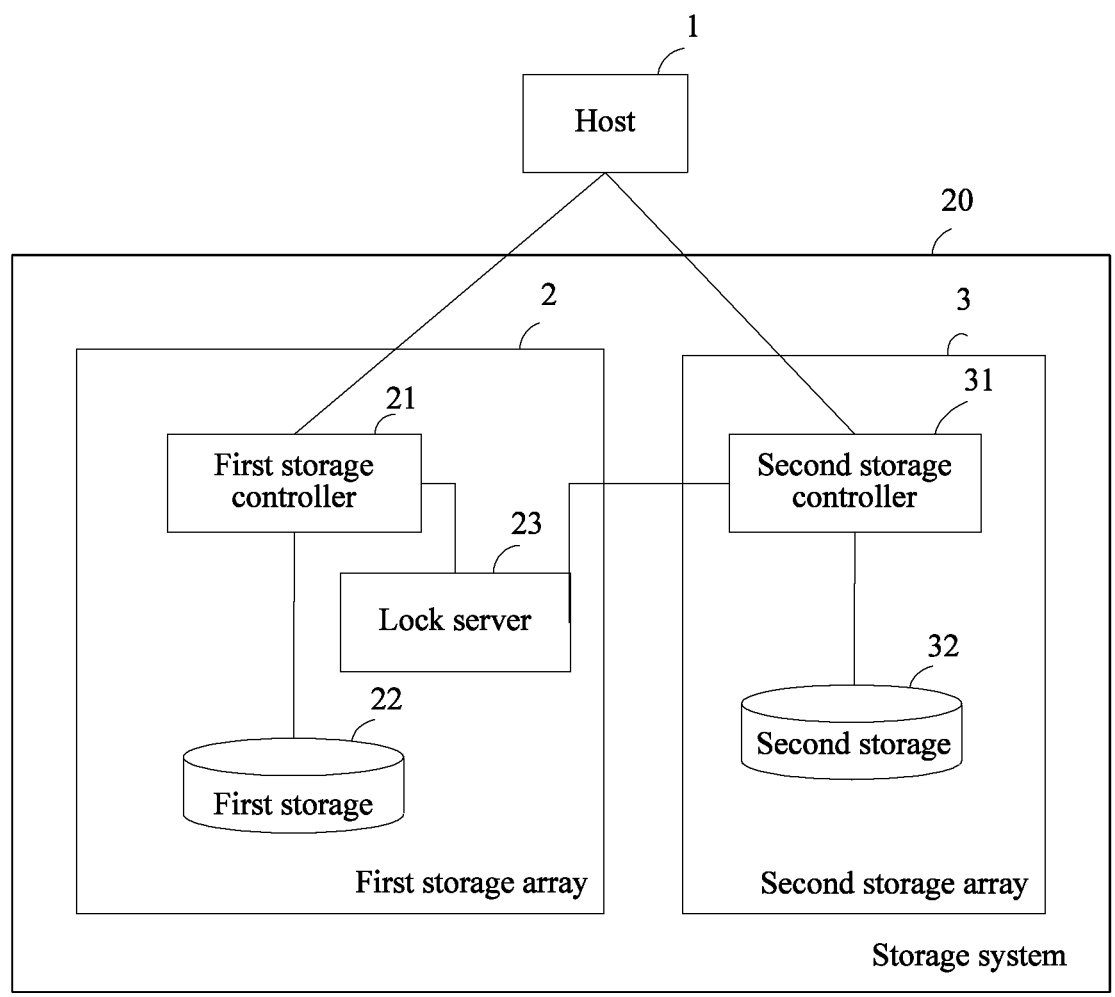
FIG. 2 is a topology diagram of an embodiment of a lock management system according to the present invention.

Referring to FIG. 2, FIG. 2 is an architectural diagram of a storage system 20 according to embodiments of the present invention. As shown in the figure, the storage system 20 includes a first storage array 2 and a second storage array 3. A host 1 is connected to a storage controller 21 of the first storage array 2 and a storage controller 31 of the second storage array 3. The first storage array 2 further includes a first storage 22 connected to the first storage controller 21. The second storage array 3 further includes a second storage 32 connected to the second storage controller 31. In addition, a lock server 23 and the second storage controller 31 are connected, for example, by using a fiber channel. Optionally, the host 1 may be connected to the second storage controller 31 of second storage array 3. The first storage array 2 may further include the lock server 23 connected to the first storage controller 21.

Data in the two storage arrays remains consistent, and when data is written to either of the storage arrays, the same data also needs to be written to the other storage array at the same location. For example, all data written to the first storage array 2 may also be written to the second storage array 3 at the same write address. The whole write process ends only if both the first storage array 2 and the second storage array 3 has completed writing.

In addition, the first storage array and the second storage array are consistent in terms of division and use of address space. That is, the first storage array and the second storage array have a same quantity of LUNs, LUN IDs correspond to each other in a one-to-one manner, and sizes of the LUNs also correspond to each other in a one-to-one manner. A same address range is used to store same data. Therefore, same data can be obtained from the two storage arrays according to a same address. When either of the storage arrays is faulty, the host can obtain required data from the other storage array.

The storage arrays in the embodiments of the present invention may be block (block)-based storage arrays, for example, a SAN; or may be object-based storage arrays. For ease of description, the SAN is used as an example for description below.

The first storage array and the second storage array may be SAN storage arrays. The storage controller is equivalent to a computer, and may receive data from the host and send data to the storage for storing. The storage may be a non-volatile storage medium, for example, a hard disk or a solid-state hard disk, which may persistently store data.

As shown in FIG. 2, an embodiment of the present invention provides a storage system 20 that includes a first storage array 2, a second storage array 3, and a lock server 23. The lock server 23 may be integrated in the first storage array 2. In the storage system, the first storage array 2 and the second storage array 3 may not communicate with each other, but rely on the lock server 23 to implement data write. Functions of the apparatuses in the storage system 20 are described in the following.

The first storage array 2 is configured to: receive a data write request, where the data write request carries to-be-written data and a write address, and the write address describes a location for storing the to-be-written data; and then send a locking request to the lock server 23, where the locking request carries a locking command, the to-be-written data, and the write address.

The lock server 23 is configured to: receive the locking request, and if it is detected that write lock permission for the write address has already been granted to the second storage array 3, send a lock revocation request to the second storage array 3, where the lock revocation request is used to withdraw the write lock permission granted to the second storage array 3, and the lock revocation request further carries the to-be-written data and the write address.

The second storage array 3 is configured to: after receiving the lock revocation request, store the to-be-written data into a local storage according to the write address, and then send a lock revocation success message to the lock server 23, where the lock revocation success message is used to describe that the second storage array 3 has finish the use of the write lock permission, and further, the lock revocation success message carries information that the to-be-written data is successfully written.

The lock server 23 is further configured to send a lock allocation message to the first storage array 2 after receiving the lock revocation success message, where the lock allocation message is used to allocate the write lock permission requested by the first storage array 2 to the first storage array 2, and is further used to describe that the second storage array 3 has completed written of the to-be-written data. The first storage array 2 is further configured to store the to-be-written data into a local storage according to the write address after receiving the lock allocation message.

Figure 3:
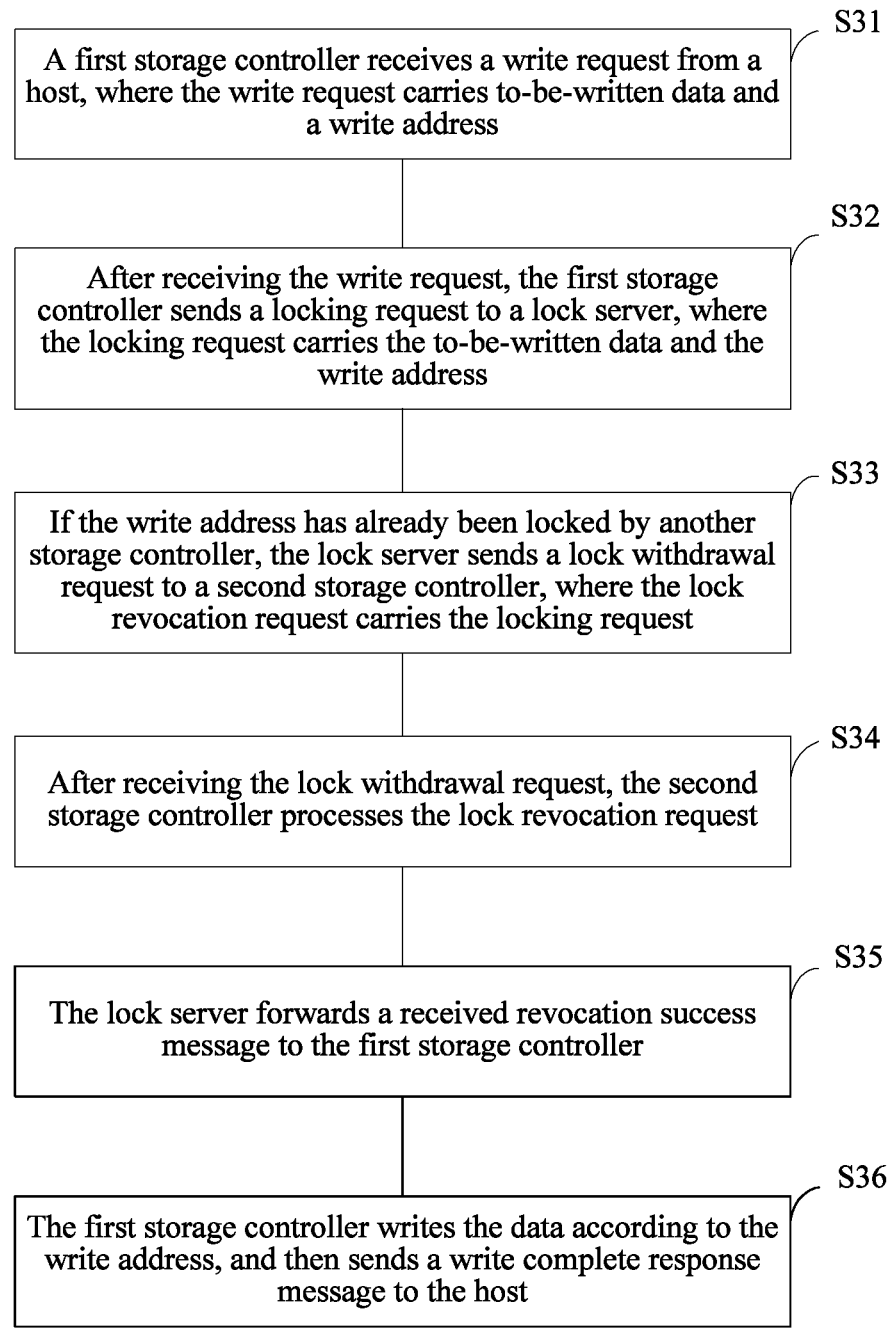
FIG. 3 is a flowchart of an embodiment of a data write method according to the present invention.

The following describes a method for storing data by using the architecture, referring to FIG. 3.

Step S31: A first storage controller receives a write request from a host. The write request carries to-be-written data and a write address.

The write request indicates that the carried to-be-written data needs to be stored. The to-be-written data is data that needs to be stored in a first storage and a second storage. The write address is an address used to store the to-be-written data into storage arrays. The write address may include two parts: a LUN ID and an address range. The LUN ID is used to mark a LUN, and the address range further marks a specific location in the LUN. The address range is, for example, a continuous address segment, and the address range may be described in two manners: a starting address plus an ending address, for example, (oXoooo1111, oXooon11111), and a starting address plus a length of the to-be-written data.

In this embodiment of the present invention, write address space is used as a minimal granularity of permission management performed by a lock server. In another embodiment, another unit may be used as a granularity of permission management. This is not explained in detail in this embodiment.

Step S32: After receiving the write request, the first storage controller sends a locking request to a lock server, to request to obtain write lock permission for storage space described by the write address. The locking request further carries the to-be-written data and the write address, and the write address describes a location for storing the to-be-written data. The locking request may further carry lock permission information for describing permission desired by the first storage controller, and the lock permission information described in this embodiment is write lock permission.

In this embodiment, the lock server is configured to manage lock permission. For example, the lock server is configured to perform lock permission allocation, lock conflict detection, and lock revocation. The lock server may be an independent server; or as shown in FIG. 2, may be hardware or software that is located in a storage array and that communicates with a storage controller; or may be software or hardware integrated in a storage controller. Different from a current system, the lock server in this embodiment of the present invention is further configured to: receive and send to-be-written data, and receive and send corresponding response messages.

In addition, the lock server may have a distributed architecture. That is, multiple lock servers jointly manage all the lock permission, and each lock server manages a part of the lock permission. For example, each storage array has a lock server, and each lock server has management permission for a partial address range. In a scenario of distributed lock management, the lock server in this embodiment of the present invention refers to a lock server having management permission for an address range that is applied for.

For example, if the write request is to partially update original data in the storage arrays, the data locking request may be represented as Lock (LUN ID, range, right, Delta Data). The Lock indicates that this is a locking request; the LUN ID is used to identify a LUN at a to be locked address; the range is used to identify an address range for locking in the LUN; the right describes desired permission (which, for example, may be write permission); and the Delta Data is to-be-written data for which the write permission is applied this time. In an embodiment, the Delta data is data that needs to be updated to the storage arrays during the current write request. Compared with the write request, the locking request has the right information, that is, the lock permission information.

The Delta Data may carry multiple data segments, and the Delta Data may be divided into multiple Delta Items according to a quantity of the included data segments. Each Delta Item includes: an offset, a length, and content. The content is a continuous to-be-written data segment, and all content together forms the to-be-written data. The offset indicates a starting location of the Content in the Delta Data. The length is a length in the Delta Item.

Optionally, if the to-be-written data is continuous, the locking request may be represented as Lock (LUN ID, range, right, data). The data is continuous data. Therefore, the data does not need to be divided into Delta Items. This locking request may be used in two possible cases. In one possible case, the whole to-be-written data is new and has not been stored in a first storage array. In another possible case, partial data (equivalent to Delta Data) is new, the remaining data is read from the storage array to form data having a continuous address, and a length of the data having a continuous address is the same as a length described by the range.

Step S33: After receiving the locking request from the first storage controller, the lock server checks whether the write address has already been locked by another storage controller.

If the write address is not locked by another storage controller, the first storage controller is authorized. That is, exclusive data write permission is allocated to the first storage controller according to an address range requested by the locking request. Next, the first storage controller writes the to-be-written data in the first storage, and sends the to-be-written data to a second storage controller, so that the second storage controller stores the to-be-written data into the second storage. After the first storage array successfully writes the to-be-written data locally, and receives, from the second storage array, a response message that the to-bewritten data is successfully written, the whole write process is completed, and the process ends.

If the write address has already been locked by another storage controller, assuming that the lock permission is granted to the second storage array, the lock server sends a lock revocation request to the second storage controller. The lock revocation request is used to withdraw the write lock permission. The lock revocation request further carries the to-be-written data and the write address, and is used to instruct the second storage array to store the to-be-written data according to the write address.

The lock revocation request in this embodiment carries the write address and the to-be-written data that are in the locking request, and is an enhanced lock revocation request. Therefore, the revocation request actually carries two pieces of information: request information for withdrawing the write lock permission, and information about the write address and the to-be-written data. A conventional revocation request carries only the request information for withdrawing the write lock permission.

Step S34: After receiving a lock revocation request, a second storage controller processes the lock revocation request.

The processing of the lock revocation request includes two parts: a first part of writing the to-be-written data carried in the lock revocation request to the local second storage controller, and a second part of returning, to the lock server, a lock revocation success message and a message that the to-be-written data is successfully written. The lock revocation success message is used to describe that the second storage array has finish the use of the write lock permission, and notify the lock server that the second storage array no longer needs to use the write lock permission and the write lock permission may be withdrawn by the lock server.

In the first part, the second storage controller writes the to-be-written data to the second storage according to the write address.

In the second storage, if data other than the to-be-written data needs to be written to the second storage, the two pieces of data may be written separately. The other data is written first, and then the to-be-written data is written.

It can be learned from step S33 that, for a same write address, there is a write lock permission conflict between the first storage array and the second storage array. Therefore, the to-be-written data and the other data are located in a same address range. Therefore, the to-be-written data and the other data may be combined in the present application, and combined data is further written into the second storage. In this way, efficiency may be further improved. A time point at which the to-be-written data is written to the storage system is later than a time point at which the other to-be-written data is written to the storage system. Therefore, the former is newer data. Therefore, during the combination, if the other to-be-written data and the to-be-written data share an address-overlapping part, the address-overlapping part is stored as content belonging to the to-be-written data. In other words, for the address-overlapping part, content belonging to the other to-be-written data is abandoned.

In the second part, after completing the write operation, the second storage controller generates the lock revocation success message and the message that the to-be-written data is successfully written, and sends the two messages to the lock server. To reduce procedures, the two messages may be combined and sent, that is, the lock revocation success message carries information that the to-be-written data is successfully written. A new lock revocation success message is used to describe that the second storage array has finish the use of the write lock permission, and is further used to describe that the second storage array has completed writing of the to-be-written data.

The storage controller may determine data write success in two manners. In a first manner, the storage controller has sent all data that needs to be written. In a second manner, after the storage has stored all received data, the storage controller receives a response message indicate that the storage has completed storing.

Step S35: The lock server forwards a received lock revocation success message to the first storage controller. Alternatively, the lock server sends a writing completed message of the second storage array to the first storage controller, and sends a write lock permission allocation message to the first storage array, where the write lock permission allocation message is used to allocate the write lock permission for the write address to the first storage controller. The two messages may be combined into one, that is, the write lock permission allocation message carries the writing completed message of the second storage array. A new lock allocation message after the combination is used to allocate the write lock permission requested by the first storage array to the first storage array, and is further used to describe that the second storage array has completed the writing of the to-be-written data. Alternatively, the lock server sends a data write instruction to the first storage controller.

Step S36: After receiving the message sent by the lock server in step S35, the first storage controller writes the to-be-written data to the first storage according to the write address determined by the LUN ID and the range. Then, the first storage controller sends a write complete response message to the host, to notify the host that the whole process of writing the to-be-written data ends. At this time, both the storage of the first storage array and the storage of the second storage array store the to-be-written data at the same storage location.

It should be noted that in FIG. 2 and the foregoing process, the lock server is located in the first storage array, and the revocation request additionally carries the write address and the to-be-written data. This is equivalent to sending the two pieces of information at a time, so that a quantity of times of communication between the lock server and the second storage array is reduced, the corresponding response messages may also be combined, and time is saved. In addition, a quantity of times of communication between the two storage controllers and the lock server is also reduced.

The messages and the response messages between the first storage array and the lock server may also be combined. Therefore, in another embodiment, if the lock server is located between the two storage arrays, or the lock server is located in the second storage array, time may also be saved.

Figure 4:
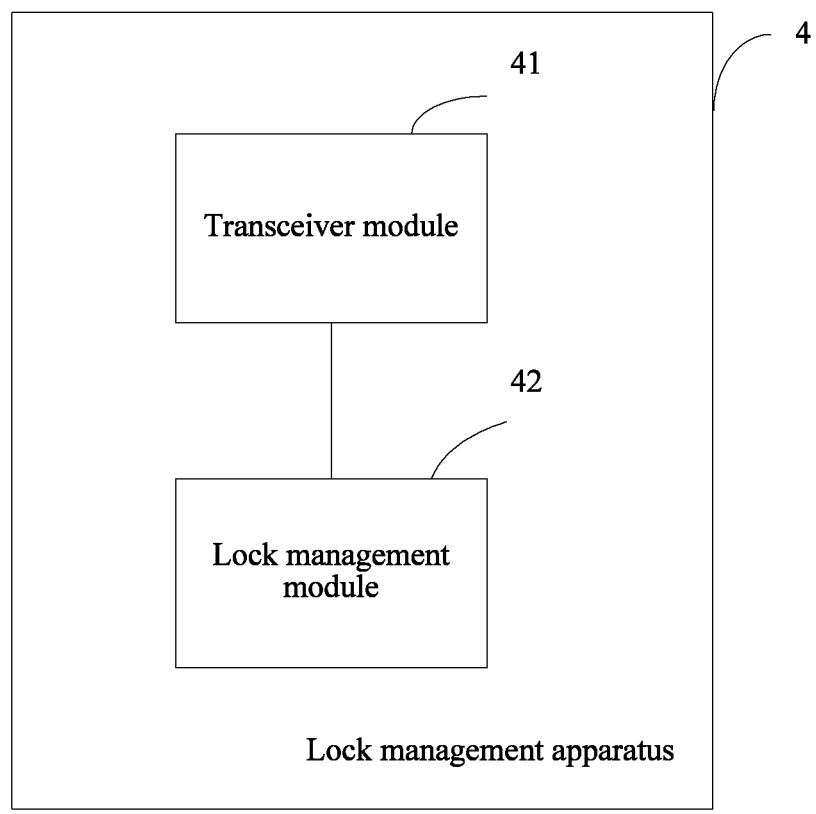
FIG. 4 is a structural diagram of an embodiment of a lock management apparatus according to the present invention.

Referring to FIG. 4, an embodiment of the present invention further provides a lock management apparatus 4. The lock management apparatus 4 may execute the steps of the lock server mentioned in the foregoing method, and may be a lock server or software running in a lock server. The lock management apparatus 4 communicates with a first storage array and a second storage array. The lock management apparatus 4 includes a transceiver module 41, configured to communicate with the first storage array and the second storage array. The lock management apparatus 4 also includes a lock management module 42, communicating with the transceiver module 41, and configured to: after receiving a locking request from the first storage array by using the transceiver module 41, generate a lock revocation request and send the lock revocation request to the second storage array by using the transceiver module 41, and after receiving a lock revocation success message from the second storage array using the transceiver module 41, generate a lock allocation message and send the lock allocation message to the first storage array by using the transceiver module 41.

The locking request carries a locking command, to-be-written data, and a write address. The write address describes a location for storing the to-be-written data. The lock revocation request is used to withdraw write lock permission granted to the second storage array. The lock revocation request further carries the to-be-written data and the write address, and the lock revocation request is further used to instruct the second storage array to store the to-be-written data according to the write address. The lock revocation success message is used to describe that the second storage array has finish the use of the write lock permission, and is further used to describe that the second storage array has written the to-be-written data. The lock allocation message is used to allocate the write lock permission requested by the first storage array to the first storage array, and is further used to describe that the second storage array has completed the writing of the to-be-written data.

The write address is a logical unit number (LUN) ID and an address range in a LUN.

The lock management apparatus 4 and functions of the modules in the lock management apparatus 4 have already been described in detail in the method embodiment, and details are not described herein again.

Figure 5:
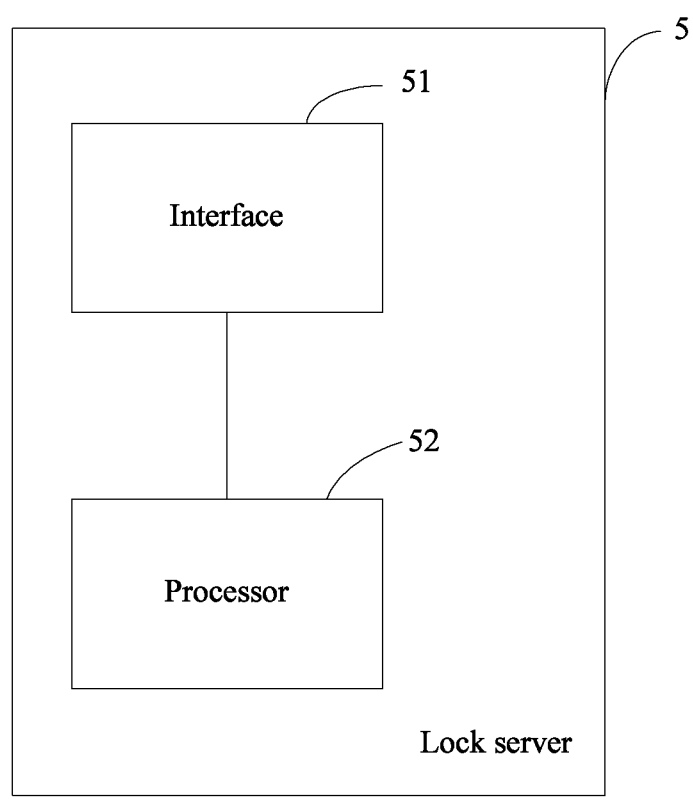
FIG. 5 is a structural diagram of an embodiment of a lock server according to the present invention.

Referring to FIG. 5, another embodiment of the present invention provides a lock server. A lock server 5 includes an interface 51 and a processor 52, and the interface 51 is connected to a first storage array and a second storage array. The lock server 5 may execute functions of the lock server mentioned in the foregoing method.

The processor 52 communicates with the interface 51, and is configured to: after receiving a locking request from the first storage array by using the interface 51, generate a lock revocation request and send the lock revocation request to the second storage array using the interface 51; and after receiving a lock revocation success message from the second storage array by using the interface 51, generate a lock allocation message and send the lock allocation message to the first storage array by using the interface 51.

Figure 6:
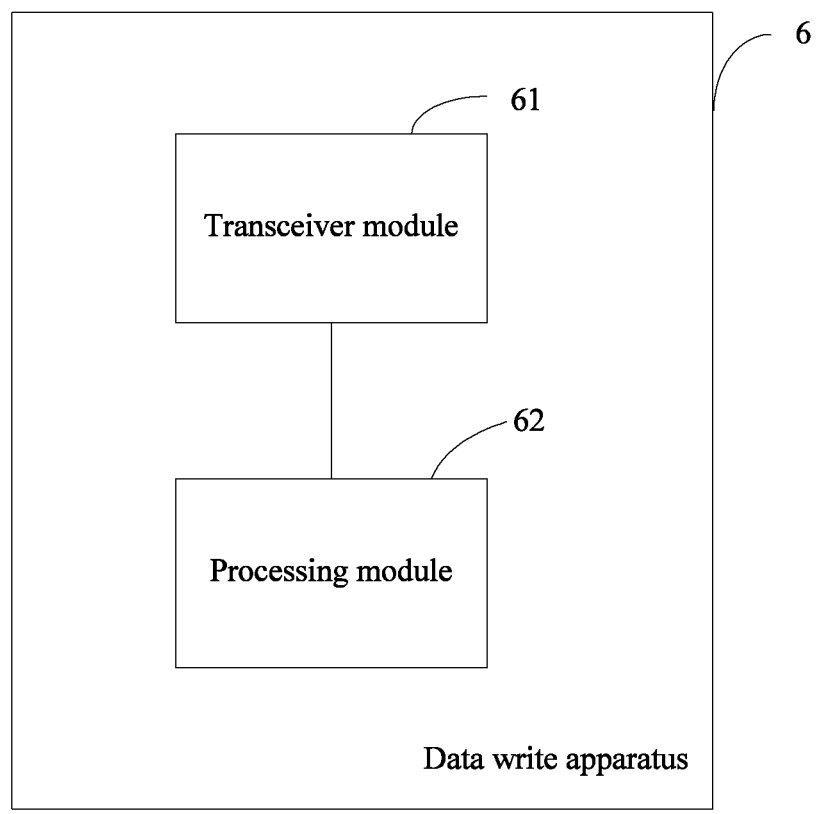
FIG. 6 is a structural diagram of an embodiment of a data write apparatus according to the present invention.

Referring to FIG. 6, an embodiment of the present invention provides a data write apparatus. The apparatus is a storage controller or software running in a controller, and functions as the controller in the first storage array in the foregoing method embodiment. A data write apparatus 6 communicates with a storage and a lock server, and the data write apparatus 6 includes a transceiver module 61 and a processing module 62.

The transceiver module 61 is configured to receive a data write request from a host, where the data write request carries to-be-written data and a write address, and the write address describes a location for storing the to-be-written data.

The processing module 62 communicates with the transceiver module 61, and is configured to: after the transceiver module 61 receives the data write request, generate a locking request and send the locking request to the lock server by using the transceiver module 61, where the locking request carries a locking command, the to-be-written data, and the write address.

The processing module 62 is further configured to: after receiving, using the transceiver module 61, a lock allocation message sent by the lock server, instruct the storage to store the to-be-written data according to the write address, where the lock allocation message is used to allocate write lock permission requested by the first storage array to the first storage array, and is further used to describe that another storage controller has written the to-be-written data according to the write address.

The processing module 62 is further configured to: after writing the data to the storage, send a data writing completed message to the host using the transceiver module 61.

The apparatus has functions of the controller in the first storage array in the foregoing method embodiment, and can execute corresponding steps. Therefore, reference may be made to the foregoing method embodiment, and details are not described herein again.

Figure 7:
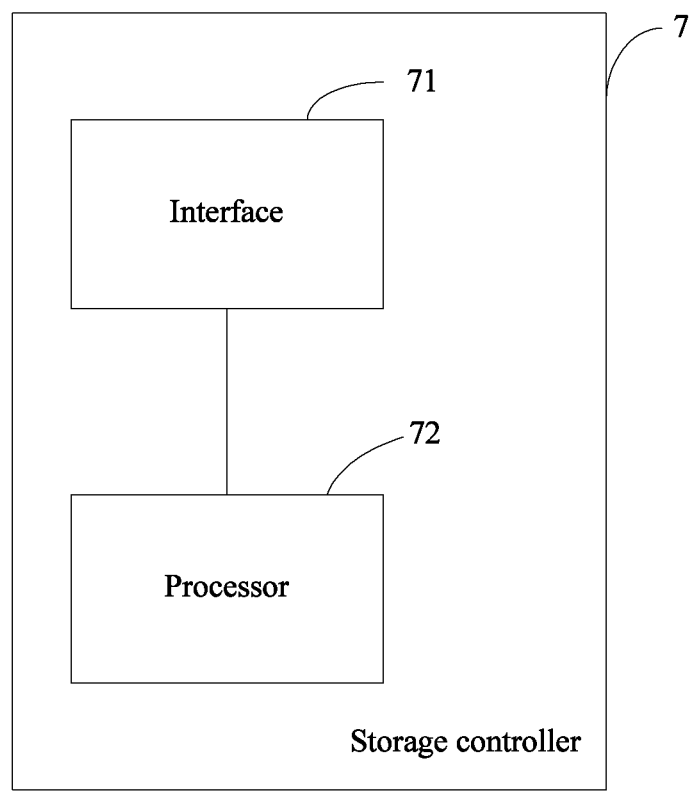
FIG. 7 is a structural diagram of an embodiment of a storage controller according to the present invention.

Referring to FIG. 7, embodiments of the present invention further provide an embodiment of a storage controller. The storage controller is combined with a storage device, has functions of the controller in the first storage array in the foregoing method embodiment, and can execute corresponding steps. For functions and executable operations of the storage controller, refer to the method embodiment. A storage controller 7 may be connected to a storage device and a lock server. The storage controller 7 includes an interface 71 and a processor 72.

The interface 71 is configured to receive a data write request from a host, where the data write request carries to-be-written data and a write address, and the write address describes a location for storing the to-be-written data.

The processor 72 communicates with the interface 71 and is configured to: after receiving the data write request using the interface 71, generate a locking request and send the locking request to the lock server using the interface 71, where the locking request carries a locking command, the to-be-written data, and the write address.

The processor 72 is further configured to: after receiving a lock allocation message sent by the lock server using the interface 71, instruct the storage to store the to-be-written data according to the write address, where the lock allocation message is used to allocate write lock permission requested by the first storage controller to the first storage controller, and is further used to describe that another storage controller has written the to-be-written data according to the write address.

The processor 72 is further configured to: after writing the data to the storage, send a data writing completed message to the host by using the interface 71.

An embodiment of the present invention provides another data write apparatus, and a structure of the apparatus is the same as the structure of the foregoing data write apparatus. Therefore, reference may be made to FIG. 6. A data write apparatus 6 is a storage controller or software running in a controller, and functions as the controller in the second storage array in the foregoing method embodiment. Actually, for different services, one data write apparatus may implement not only functions of the first storage controller, but also functions of the second storage controller. Therefore, the data write apparatus in this embodiment and the data write apparatus mentioned in the foregoing embodiment may be combined into one data write apparatus.

In this embodiment, the data write apparatus 6 is granted with write lock permission. The data write apparatus communicates with a storage and a lock server. The data write apparatus 6 includes: a transceiver module 61, configured to receive a lock revocation request sent by the lock server, where the lock revocation request is used to withdraw the write lock permission, and the lock revocation request further carries to-be-written data and the write address. The data write apparatus 6 also includes a processing module 62, configured to: instruct the storage to store the to-be-written data according to the write address, and generate a lock revocation success message, where the lock revocation success message is used to describe that the data write apparatus has finish the use of the write lock permission, and further, the lock revocation success message carries information that the to-be-written data is successfully written. The transceiver module 61 is further configured to send the lock revocation success message to the lock server.

Embodiments of the present invention further provide an embodiment of a storage controller, and a structure of the storage controller is the same as the structure of the storage controller in the foregoing embodiment. Therefore, reference may also be made to FIG. 7.

A storage controller 7 in this embodiment is combined with a storage device, and is equivalent to the storage controller in the second storage array in the foregoing method embodiment. For functions and executable operations of the storage controller 7, refer to the method embodiment.

The storage controller 7 is granted with write lock permission, and the storage controller is connected to a storage device and a lock server.

An interface 71 is configured to receive a lock revocation request sent by the lock server, where the lock revocation request is used to withdraw the write lock permission, and the lock revocation request further carries to-be-written data and the write address. A processor 72 is connected to the interface 71 and is configured to: instruct the storage to store the to-be-written data according to the write address, and generate a lock revocation success message, where the lock revocation success message is used to describe that the storage controller has finish the use of the write lock permission, and further, the lock revocation success message carries information that the to-be-written data is successfully written. The interface 71 is further configured to send the lock revocation success message to the lock server.

A lock server includes a processor and an interface, and the interface is connected to a first storage controller and a second storage controller. Operations executed by the lock server are specifically executed by the processor. The lock server may further include a memory, and the processor runs a program in the memory so that the lock server executes the operations of the lock server.

There are two interpretations for the "storage array" in the foregoing embodiments of the present invention. In one interpretation, the storage array is a combination of a storage controller and a storage, and the "local storage" is a storage managed by the storage controller. In another interpretation, the storage array is a storage controller and does not include a storage, and the "local storage" is a storage managed by the storage controller.

The embodiments of the present invention may further be used to delete data, and a difference lies in that to-be-written data does not need to be sent, and only a deletion address needs to be provided.

Each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access storage (RAM), a read-only storage (ROM), an erasable programmable read only storage (EPROM or flash storage), an optical fiber, and a compact disc read only storage (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

What is claimed is:

1. A method, comprising:
   receiving, by a lock server, a locking request from a first storage system, wherein the locking request comprises a locking command, first target data, and a first write address, and the first write address identifies a location for storing the first target data in the first storage system and a second storage system;
   in response to determining that write lock permission for the first write address is currently granted to the second storage system, sending, by the lock server, a lock revocation request to the second storage system, wherein the lock revocation request comprises information requesting to withdraw the write lock permission currently granted to the second storage system, the lock revocation request further comprises the first target data and the first write address, the first target data is to-be-written data, and the lock revocation request instructs the second storage system to store the first target data according to the first write address;
   receiving, by the lock server, a lock revocation success message from the second storage system, wherein the lock revocation success message indicates that the second storage system has completed writing the first target data in the second storage system; and
   sending, by the lock server, a lock allocation message to the first storage system, wherein the lock allocation message allocates the write lock permission to the first storage system.

2. The method according to claim 1, further comprising:
   after receiving the lock allocation message, storing, by the first storage system, the first target data according to the first write address.

3. The method according to claim 1, wherein the first storage system and the second storage system each comprise a respective storage area network (SAN) storage controller and a respective storage device connected to the SAN storage controller.

4. The method according to claim 3, wherein the first write address comprises a logical unit number (LUN) identifier (ID) and an address range in a LUN.

5. The method according to claim 1, wherein the first storage system and the second storage system each comprise a respective Network Attached Storage (NAS).

6. The method according to claim 1, wherein the first storage system and the second storage system each comprise a respective object storage system.

7. A data storage system, comprising:
a lock server;
a first storage system; and
a second storage system;
wherein the first storage system is configured to:
receive a data write request, wherein the data write request comprises first target data and a first write address, and the first write address identifies a location for storing the first target data in the first storage system and the second storage system; and
send a locking request to the lock server, wherein the locking request comprises a locking command, the first target data, and the first write address;
wherein the lock server is configured to:
receive the locking request; and
in response to determining write lock permission for the first write address is currently granted to the second storage system, send a lock revocation request to the second storage system, wherein the lock revocation request comprises information requesting to withdraw the write lock permission for the first write address, and further comprises the first target data and the first write address, wherein the first target data is to-be-written data;
wherein the second storage system is configured to:
receive the lock revocation request;
store the first target data according to the first write address; and
send a lock revocation success message to the lock server, wherein the lock revocation success message indicates that the first target data has been successfully written in the second storage system;
wherein the lock server is further configured to:
receive the lock revocation success message; and
send a lock allocation message to the first storage system, wherein the lock allocation message allocates the write lock permission to the first storage system; and
wherein the first storage system is further configured to store the first target data according to the first write address after receiving the lock allocation message.

8. The data storage system according to claim 7, wherein the first storage system and the second storage system each comprise a respective storage area network (SAN) storage controller and a respective storage device connected to the SAN storage controller.

9. A lock server, comprising:
a processor; and
an interface, wherein the interface coupled to the processor;
wherein the processor is configured to:
receive a locking request from a first storage system, wherein the locking request comprises a locking command, first target data, and a first write address, and the first write address identifies a location for storing the first target data in the first storage system and a second storage system;
in response to determining that write lock permission for the first write address is currently granted to the second storage system, send a lock revocation request to the second storage system, wherein the lock revocation request comprises information requesting to withdraw the write lock permission granted to the second storage system, the lock revocation request further comprises the first target data and the first write address, the first target data is to-be-written data, and the lock revocation request instructs the second storage system to store the first target data according to the first write address;
receive a lock revocation success message from the second storage system, wherein the lock revocation success message indicates that the second storage system has completed writing the first target data in the second storage system; and
send a lock allocation message to the first storage system, wherein the lock allocation message allocates the write lock permission to the first storage system.

10. The lock server according to claim 9, wherein the processor is further configured to store the first target data according to the first write address.

11. The lock server according to claim 9, wherein the first storage system and the second storage system each comprise a respective storage area network (SAN) storage controller and a respective storage device connected to the SAN storage controller.

12. The lock server according to claim 11, wherein the first write address comprises a logical unit number (LUN) identifier (ID) and an address range in a LUN.

13. A method, comprising:
receiving, by a first storage system, a data write request, wherein the data write request comprises first target data and a first write address, and the first write address identifies a location for storing the first target data in the first storage system and a second storage system;
sending, by the first storage system, a locking request to a lock server, wherein the locking request comprises a locking command, the first target data, and the first write address;
receiving, by the lock server, the locking request;
in response to determining that write lock permission for the first write address is currently granted to the second storage system, sending, by the lock server, a lock revocation request to the second storage system, wherein the lock revocation request comprises the first target data and the first write address, the first target data is to-be-written data, and the lock revocation request further comprises information requesting to withdraw the write lock permission for the first write address;
storing, by the second storage system, the first target data according to the first write address;
sending, by the second storage system, a lock revocation success message to the lock server, wherein the lock revocation success message indicates that the first target data has been successfully written in the second storage system;
receiving, by the lock server, the lock revocation success message;
sending, by the lock server, a lock allocation message to the first storage system, wherein the lock allocation message allocates the write lock permission to the first storage system; and
storing, by the first storage system, the first target data according to the first write address after receiving the lock allocation message.

* * * * *